(12) United States Patent
Yokohara et al.

(10) Patent No.: US 9,907,316 B2
(45) Date of Patent: Mar. 6, 2018

(54) GAS SUPPLY DEVICE AND REFRIGERATION DEVICE FOR CONTAINER PROVIDED WITH SAID GAS SUPPLY DEVICE

(71) Applicant: DAIKIN INDUSTRIES, LTD., Osaka-shi, Osaka (JP)

(72) Inventors: Kazuma Yokohara, Osaka (JP); Masataka Nakano, Osaka (JP); Noritaka Kamei, Osaka (JP); Naohiro Tanaka, Osaka (JP); Atsushi Ozato, Osaka (JP); Yuusuke Fujimoto, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/550,391

(22) PCT Filed: Feb. 4, 2016

(86) PCT No.: PCT/JP2016/000580
§ 371 (c)(1),
(2) Date: Aug. 11, 2017

(87) PCT Pub. No.: WO2016/136153
PCT Pub. Date: Sep. 1, 2016

(65) Prior Publication Data
US 2018/0020687 A1    Jan. 25, 2018

(30) Foreign Application Priority Data

Feb. 27, 2015    (JP) ................................. 2015-039254

(51) Int. Cl.
*A23B 7/152* (2006.01)
*F25D 11/00* (2006.01)
(Continued)

(52) U.S. Cl.
CPC .......... *A23B 7/148* (2013.01); *B01D 53/0423* (2013.01); *B01D 53/0446* (2013.01);
(Continued)

(58) Field of Classification Search
CPC ......... A23B 7/148; F25D 11/00; F25D 23/12; B01D 53/0423; B01D 53/0446; B01D 2253/108; B01D 2256/12; B01D 2257/102; B01D 2259/40083; B01D 2259/402; B01D 2259/4566
(Continued)

(56) References Cited

U.S. PATENT DOCUMENTS 4,127,395 A * 11/1978 McKey ................ B01D 53/261
                                                    95/10
4,312,641 A *  1/1982 Verrando ............... B01D 53/04
                                                    95/105
(Continued)

FOREIGN PATENT DOCUMENTS

CN          1048949 C      2/2000
JP          H07-31826      2/1995
(Continued)

OTHER PUBLICATIONS

International Search Report, issued in PCT/JP2016/000580 (PCT/ISA/210), dated Apr. 26, 2016.

*Primary Examiner* — Frank Lawrence
(74) *Attorney, Agent, or Firm* — Birch, Stewart, Kolasch & Birch, LLP

(57) ABSTRACT

Disclosed is a gas supply device provided for a container in which a breathing plant is housed. The device supplies nitrogen-enriched air into the container. The device is provided with a malfunction diagnosis section which checks whether each of components of the device works properly or not and specifies a malfunctioning portion if an oxygen concentration of the nitrogen-enriched air does not fall to or below a predetermined concentration. The malfunction diagnosis section checks whether each of an air pump, a motor, and a switching mechanism works properly or not, and determines that an adsorbent is not working properly when it is determined that all of the air pump, the motor, and the switching mechanism are working properly.

20 Claims, 7 Drawing Sheets

(51) Int. Cl.
*A23B 7/148* (2006.01)
*B01D 53/04* (2006.01)
*F25D 23/12* (2006.01)

(52) U.S. Cl.
CPC .............. *F25D 11/00* (2013.01); *F25D 23/12* (2013.01); *B01D 2253/108* (2013.01); *B01D 2256/12* (2013.01); *B01D 2257/102* (2013.01); *B01D 2259/402* (2013.01); *B01D 2259/40083* (2013.01)

(58) Field of Classification Search
USPC ................ 96/108, 112, 113, 117, 117.5, 121
See application file for complete search history.

(56) References Cited

U.S. PATENT DOCUMENTS

| | | |
|---|---|---|
| 5,438,841 A | 8/1995 | Cahill-O'Brien et al. |
| 5,457,963 A | 10/1995 | Cahill-O'Brien et al. |
| 5,515,693 A | 5/1996 | Cahill-O'Brien et al. |
| 5,531,807 A * | 7/1996 | McCombs ............... A62B 7/14 55/357 |
| 5,893,944 A * | 4/1999 | Dong ................... B01D 53/053 96/114 |
| 6,238,458 B1 * | 5/2001 | Monereau ............ B01D 53/053 95/101 |
| 7,954,490 B2 * | 6/2011 | Jagger ................... A61M 16/10 128/201.25 |
| 2012/0285327 A1 * | 11/2012 | Schal ..................... B60T 17/02 96/113 |
| 2013/0042754 A1 * | 2/2013 | Lomax ................ B01D 53/047 95/19 |

FOREIGN PATENT DOCUMENTS

| | | |
|---|---|---|
| JP | 7-313052 A | 12/1995 |
| JP | 8-167 A | 1/1996 |
| JP | 8-168 A | 1/1996 |

* cited by examiner

GAS SUPPLY DEVICE AND REFRIGERATION DEVICE FOR CONTAINER PROVIDED WITH SAID GAS SUPPLY DEVICE

TECHNICAL FIELD

The present invention relates to a gas supply device which supplies nitrogen-enriched air into a container, and a container refrigeration apparatus having the gas supply device.

BACKGROUND ART

Various measures have been taken to store plants (e.g., fruits and vegetables) in a container used in marine transportation for a long period of time while keeping the plants fresh. As an example of such measures, a technique for keeping freshness of plants, while taking the fact into account that freshness of plants considerably decreases as they breathe, has been known. In this technique, gas having a lower oxygen concentration than the outside air is supplied into the container to decrease the oxygen concentration of the air in the container, thereby reducing the breathing of the plants and keeping the plants fresh (see, e.g., Patent Document 1 below).

Patent Document 1 discloses a gas supply device in which air is guided to an adsorption column filled with a nitrogen adsorbent, and is pressurized to have the nitrogen in the air adsorbed onto the adsorbent. After that, the adsorption column is depressurized to recover the nitrogen adsorbed on the adsorbent, thereby generating nitrogen-enriched air with a nitrogen concentration higher than the outside air. This nitrogen-enriched air is supplied into the container.

CITATION LIST

Patent Document

PATENT DOCUMENT 1: Japanese Unexamined Patent Publication No. H07-313052

SUMMARY OF THE INVENTION

Technical Problem

Adsorbents deteriorate with time. When the adsorbent in the above-described gas supply device deteriorates, the adsorbent cannot produce the nitrogen-enriched air with a desired nitrogen concentration. Thus, the oxygen concentration of the air in the container cannot be reduced to a target concentration. For this reason, the deteriorated adsorbent needs to be replaced. In the gas supply devices such as those described above, the adsorbent is replaced after certain days of use.

However, the degree of deterioration of the adsorbents differs depending on the conditions of use. Thus, if when to replace the adsorbent is determined based on the days of use, the adsorbent may be replaced wastefully, or on the contrary, may be used continuously despite the necessity of replacement.

In view of the foregoing background, it is therefore an object of the present invention to provide a gas supply device utilizing an adsorbent to produce nitrogen-enriched air, as well as a container refrigeration apparatus having the gas supply device, in which performance of the adsorbent can be determined from the operational state of the gas supply device.

Solution to the Problem

A first aspect of the present invention is directed to a gas supply device provided for a container (11) in which a breathing plant (15) is housed. The device includes: a first adsorption portion (34) and a second adsorption portion (35) in each of which an adsorbent for adsorbing nitrogen in air is provided; an air pump (31) having a first pump mechanism (31a) connected to one of the first adsorption portion (34) and the second adsorption portion (35), and a second pump mechanism (31b) connected to the other one of the first adsorption portion (34) and the second adsorption portion (35), the first pump mechanism (31a) supplying outside air to the first or second adsorption portion to allow the adsorbent to adsorb nitrogen in the outside air and thereby producing oxygen-enriched air having a higher oxygen concentration than the outside air, the second pump mechanism (31b) sucking air from the first or second adsorption portion and thereby producing nitrogen-enriched air containing the nitrogen desorbed from the adsorbent; a motor (41) which drives the air pump (31); a switching mechanism (32, 33) which alternately switches between a first connection state in which the first adsorption portion (34) is connected to the first pump mechanism (31a) and the second adsorption portion (35) is connected to the second pump mechanism (31b), and a second connection state in which the second adsorption portion (35) is connected to the first pump mechanism (31a) and the first adsorption portion (34) is connected to the second pump mechanism (31b); a supply passage (44) which allows the second pump mechanism (31b) to communicate with an interior of the container (11) and guides the nitrogen-enriched air to the interior of the container (11); and an oxygen discharge passage (45) which allows the first and second adsorption portions (34) and (35) to communicate with an outside and guides the oxygen-enriched air to the outside. The gas supply device has a malfunction diagnosis section (91) which checks whether each of components of the gas supply device works properly or not and specifies a malfunctioning portion if an oxygen concentration of the nitrogen-enriched air does not fall to or below a predetermined concentration. The malfunction diagnosis section (91) checks whether each of the air pump (31), the motor (41), and the switching mechanism (32, 33) works properly or not, and determines that the adsorbent is not working properly when it is determined that all of the air pump (31), the motor (41), and the switching mechanism (32, 33) work properly.

In the first aspect, the first pump mechanism (31a) alternately supplies outside air to the first and second adsorption portions (34) and (35), where the adsorbent adsorbs nitrogen in the outside air, thereby producing oxygen-enriched air having a higher oxygen concentration than the outside air. On the other hand, the second pump mechanism (31b) alternately sucks the air from the first and second adsorption columns (34) and (35) to desorb the nitrogen adsorbed onto the adsorbent, thereby producing nitrogen-enriched air containing the nitrogen. If the oxygen concentration of the thus produced nitrogen-enriched air does not fall to or below a predetermined concentration, the malfunction diagnosis section (91) checks whether each of components of the gas supply device (30) works properly or not and specifies a malfunctioning portion. Specifically, the malfunction diagnosis section (91) checks whether each of the air pump (31), the motor (41), and the switching mechanism (32, 33) works properly or not. If it is determined that all of the air pump (31), the motor (41), and the switching mechanism (32, 33) work properly, the malfunction diagnosis section (91) determines that the adsorbents in the first and second adsorption columns (34) and (35) do not work properly.

A second aspect of the invention is an embodiment of the first aspect. In the second aspect, the gas supply device further includes a unit case (70) which houses at least the air pump (31) and the motor (41), wherein the malfunction diagnosis section (91) determines that the air pump (31) and the motor (41) work properly if a temperature in the unit case (70) increases after start of operation of the air pump (31) from a temperature in the unit case (70) before the start of the operation of the air pump (31), and determines that the air pump (31) or the motor (41) malfunctions if the temperature in the unit case (70) does not increase after the start of the operation of the air pump (31) from the temperature in the unit case (70) before the start of the operation of the air pump (31).

In the second aspect, at least the air pump (31) and the motor (41) are housed in the unit case (70). If the air pump (31) and the motor (41) work properly, heat is generated during operation of the air pump (31). Thus, if the air pump (31) and the motor (41) work properly, the temperature in the unit case (70) increases after the start of operation of the air pump (31) from the temperature before the start of the operation of the air pump (31). The malfunction diagnosis section (91) therefore determines that the air pump (31) and the motor (41) work properly if the temperature in the unit case (70) increases after the start of operation of the air pump (31) from the temperature before the start of operation of the air pump (31), whereas the malfunction diagnosis section (91) determines that the air pump (31) or the motor (41) malfunctions if the said temperature does not increase from the temperature before the start of operation of the air pump (31).

A third aspect of the invention is an embodiment of the first aspect. In the third aspect, the malfunction diagnosis section (91) determines that the air pump (31) and the motor (41) work properly if a pressure in the oxygen discharge passage (45) increases after start of operation of the air pump (31) from a pressure in the oxygen discharge passage (45) before the start of the operation of the air pump (31), and determines that the air pump (31) or the motor (41) malfunctions if the pressure in the oxygen discharge passage (45) does not increase after the start of the operation of the air pump (31) from the pressure in the oxygen discharge passage (45) before the start of the operation of the air pump (31).

In the third aspect, if the air pump (31) and the motor (41) work properly, the operation of the air pump (31) causes the first pump mechanism (31a) to compress the outside air. The compressed outside air is supplied into the first and second adsorption portions (34) and (35), where the compressed outside air is turned into oxygen-enriched air, which flows into the oxygen discharge passage (45). That is, the pressure in the oxygen discharge passage (45) is approximately the same as the pressure of the outside air compressed by the first pump mechanism (31a). On the other hand, no air flows into the oxygen discharge passage (45) before the start of operation of the air pump (31). Thus, the pressure in the oxygen discharge passage (45) which communicates with the outside is approximately the same as the pressure of the outside air. Thus, if the air pump (31) and the motor (41) work properly, the pressure in the oxygen discharge passage (45) increases after the start of operation of the air pump (31) from the pressure before the start of the operation of the air pump (31). The malfunction diagnosis section (91) therefore determines that the air pump (31) and the motor (41) work properly if the pressure in the oxygen discharge passage (45) increases after the start of operation of the air pump (31) from the pressure before the start of operation of the air pump (31), whereas the malfunction diagnosis section (91) determines that the air pump (31) or the motor (41) malfunctions if the said pressure does not increase from the pressure before the start of operation of the air pump (31).

A fourth aspect of the invention is an embodiment of the second or third aspect. In the fourth aspect, the malfunction diagnosis section (91) determines that the air pump (31) malfunctions if it is determined that the air pump (31) or the motor (41) is malfunctioning and a value of a current of the motor (41) is in a predetermined normal range, and that the motor (41) malfunctions if it is determined that the air pump (31) of the motor (41) is malfunctioning and the value of the current of the motor (41) does not fall within the predetermined normal range.

In the fourth aspect, the malfunction diagnosis section (91) checks whether the value of the current of the motor (41) is in a predetermined normal range or not if it is determined that the air pump (31) or the motor (41) malfunctions. If the value of the current of the motor (41) is in the predetermined normal range, the malfunction diagnosis section (91) determines that the air pump (31) malfunctions. If the value of the current of the motor (41) does not fall within the predetermined normal range, the malfunction diagnosis section (91) determines that the motor (41) malfunctions.

A fifth aspect of the invention is an embodiment of any one of the first to fourth aspects. In the fifth aspect, the switching mechanism (32, 33) includes a first solenoid valve (32) which switches between a first state where the first adsorption portion (34) is connected to the first pump mechanism (31a), and a second state where the first adsorption portion (34) is connected to the second pump mechanism (31b), and a second solenoid valve (33) which switches between a first state where the second adsorption portion (35) is connected to the second pump mechanism (31b), and a second state where the second adsorption portion (35) is connected to the first pump mechanism (31a). The switching mechanism (32, 33) is capable of switching between a dual pressurization state in which the first solenoid valve (32) is in the first state and the second solenoid valve (33) is in the second state, and a dual depressurization state in which the first solenoid valve (32) is in the second state and the second solenoid valve (33) is in the first state. The first and second solenoid valves (32) and (33) are switched to one of the dual pressurization state and the dual depressurization state when both of the first and second solenoid valves (32) and (33) are not energized, and switched to the other one of the dual pressurization state and the dual depressurization state when the both of the first and second solenoid valves (32) and (33) are energized. the malfunction diagnosis section (91) determines that the switching mechanism (32, 33) works properly if a difference in pressure in the oxygen discharge passage (45) before and after a switching operation, in which the first and second solenoid valves (32) and (33) are simultaneously switched from a nonenergized state to an energized state, is more than or equal to a predetermined pressure, and determines that the switching mechanism (32, 33) malfunctions if the difference in pressure in the oxygen discharge passage (45) before and after the switching operation is less than the predetermined pressure.

In the fifth aspect, the malfunction diagnosis section (91) performs the switching operation in which the first and second solenoid valves (32) and (33) are simultaneously switched from a nonenergized state to an energized state. This switching operation switches the connection state between the air pump (31) and the first and second adsorption columns (34) and (35) from the dual pressurization state to the dual depressurization state, or from the dual depressurization state to the dual pressurization state. In the dual pressurization state, both of the first and second adsorption portions (34) and (35) are pressurized by the first pump mechanism (31a), and oxygen-enriched air is produced in both of the columns (34) and (35). This oxygen-enriched air flows into the oxygen discharge passage (45). Thus, the pressure in the oxygen discharge passage (45) is approximately the same as the pressure of the outside air compressed by the first pump mechanism (31a). On the other hand, in the dual depressurization state, both of the first and second adsorption portions (34) and (35) are depressurized by the second pump mechanism (31b), and thus no air flows out of the first and second adsorption portions (34) and (35) into the oxygen discharge passage (45). Thus, the pressure in the oxygen discharge passage (45) communicating with the outside is approximately the same as the pressure of the outside air. Thus, if the switching mechanism (32, 33) works properly, the pressure in the oxygen discharge passage (45) drops or increases by the energization operation in which the dual pressurization state is switched to the dual depressurization state, or the dual depressurization state is switched to the dual pressurization state.

Due to this configuration, the malfunction diagnosis section (91) determines that the switching mechanism (32, 33) works properly if the difference in pressure in the oxygen discharge passage (45) before and after the switching operation is more than or equal to the predetermined pressure, and determines that the switching mechanism (32, 33) malfunctions if said difference is less than the predetermined pressure.

A sixth aspect of the invention is an embodiment of any one of the first to fifth aspects. In the sixth aspect, the gas supply device further includes a malfunction notifier (92) which, if the malfunction diagnosis section (91) specifies a malfunctioning portion in the gas supply device (30), notifies a user of the malfunctioning portion.

In the sixth aspect, after the malfunctioning portion in the gas supply device (30) is specified by the malfunction diagnosis section (91), the malfunction notifier (92) notifies the user of the malfunctioning portion.

A seventh aspect of the invention is directed to a container refrigeration apparatus attached to a container (11) in which a breathing plant (15) is housed. The apparatus includes: a refrigerant circuit (20) which performs a refrigeration cycle to cool inside air of the container (11); and an inside air control system (60) which includes a gas supply device (30) which supplies gas into the container (11), and an exhaust portion (46) through which the inside air of the container (11) is exhausted outside, the inside air control system (60) controlling a composition of the inside air in the container (11), wherein the gas supply device (30) is comprised of the gas supply device of any one of the first to sixth aspects of the invention.

In the seventh aspect, a refrigeration cycle is performed in the refrigerant circuit (20), thereby cooling the inside air of the container (11). In addition, the composition of the inside air of the container (11) is adjusted by supplying the nitrogen-enriched air produced in the gas supply device (30) of the inside air control system (60) into the container (11), and discharging the inside air of the container (11) through the exhaust portion (46) of the inside air control system (60).

Advantages of the Invention

A malfunction caused by the performance degradation of the adsorbent is hard to be specified from the operational condition of the gas supply device (30). Thus, according to the first aspect, the malfunction is specified from the result of a check of the air pump (31), the motor (41), and the switching mechanism (32, 33) because it is relatively easy to determine whether these components work properly or not. Specifically, whether each of the air pump (31), the motor (41), and the switching mechanism (32, 33) work properly or not is determined. When it is determined that all of these components work properly, it is determined that the adsorbents in the first and second adsorption portions (34) and (35) do not work properly. Thus, according to the first aspect, a malfunction caused by the performance degradation of the adsorbent can be easily specified from the operational condition of the gas supply device. A drop in performance of the adsorbent can thus be detected, which may keep the adsorbent from being replaced wastefully, and allows the adsorbent to be replaced at an appropriate timing.

According to the second aspect, since the air pump (31) and the motor (41) are housed in the unit case (70), whether the air pump (31) and the motor (41) work properly or not is determined after the start of the operation of the air pump (31) based on whether the temperature in the unit case (70) increases or not from the temperature before the start of the operation of the air pump (31). Thus, whether the air pump (31) and the motor (41) work properly or not can be easily determined.

Further, according to the third aspect, whether the air pump (31) and the motor (41) work properly or not is determined according to whether the pressure in the oxygen discharge passage (45) increases or not after the start of operation of the air pump (31) from the pressure before the start of the operation of the air pump (31), because if the air pump (31) and the motor (41) work properly, the pressure in the oxygen discharge passage (45) becomes equal to the pressure of the outside air compressed by the first pump mechanism (31a) after the start of operation of the air pump (31). Thus, whether the air pump (31) and the motor (41) work properly or not can be easily determined.

According to the fourth aspect, in the case where it is determined that the air pump (31) or the motor (41) malfunctions, it is determined that the air pump (31) malfunctions if the value of the current of the motor (41) is in the normal range, and that the motor (41) malfunctions if the value of the current of the motor (41) does not fall within the normal range, because if the motor (41) works properly, the value of the current of the motor (41) falls within the normal range. This configuration does not require the provision of another pressure sensor to detect whether the air pump (31) works properly or not. Which of the air pump (31) or the motor (41) malfunctions can be easily determined by simply measuring the values of the current of the motor (41).

Further, according to the fifth aspect, it is determined that the switching mechanism (32, 33) works properly if the difference in the pressure in the oxygen discharge passage (45) before and after the energization switching operation is more than or equal to a predetermined value, whereas it is determined that the switching mechanism (32, 33) malfunctions if the difference in said pressure before and after the energization operation is less than the predetermined value, because if the switching mechanism (32, 33) works properly, the difference in the pressure in the oxygen discharge passage (45) before and after the energization operation is more than or equal to the predetermined pressure. Thus, whether the switching mechanism (32, 33) works properly or not can be easily determined by simply detecting the pressure of the oxygen discharge passage (45).

According to the sixth aspect, the malfunction notifier (92) notifies the user of the malfunctioning portion of the gas supply device (30) specified by the malfunction diagnosis section (91). Thus, the user is immediately notified of the malfunctioning portion of the gas supply device, and prompted to replace that portion. As a result, the gas supply device may continue to work properly. Therefore, the composition of the air in the container (11) may be accurately controlled to a desired composition.

DESCRIPTION OF EMBODIMENTS

Embodiments of the present invention will now be described in detail with reference to the drawings. Note that the following description of embodiments is merely examples in nature, and is not intended to limit the scope, application, or uses of the present invention.

First Embodiment

Figure 1:
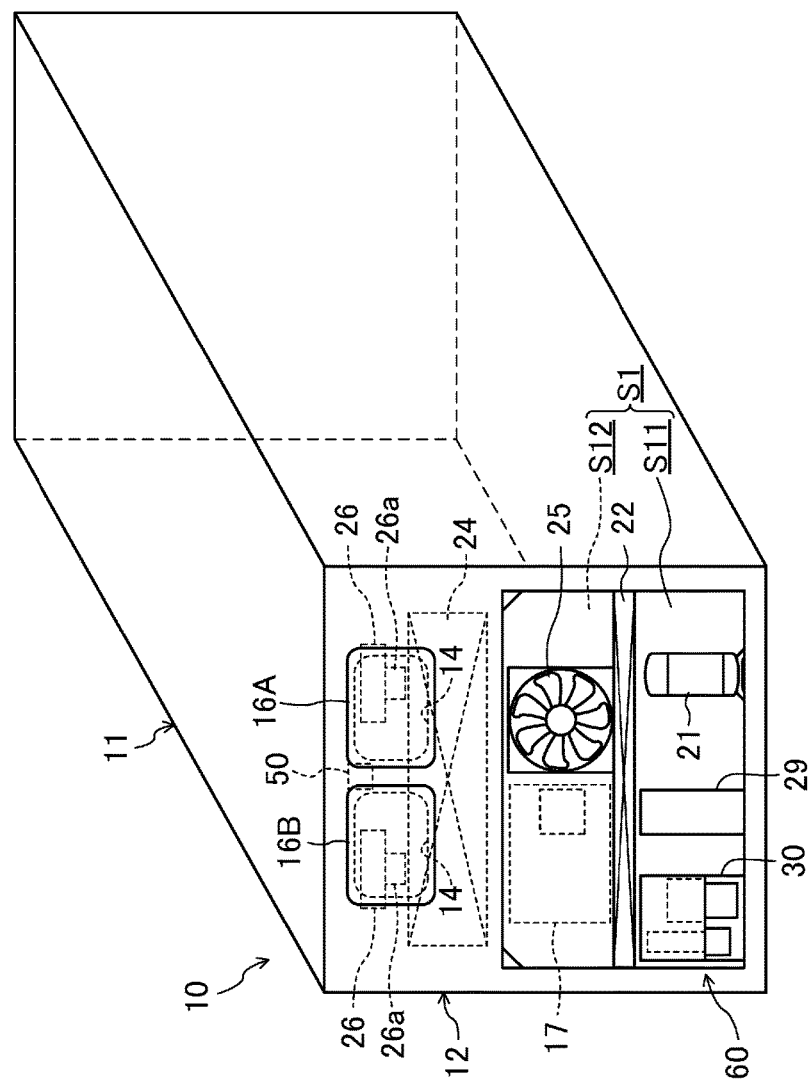
FIG. 1 is a perspective view illustrating a container refrigeration apparatus of a first embodiment as viewed from outside.
Figure 2:
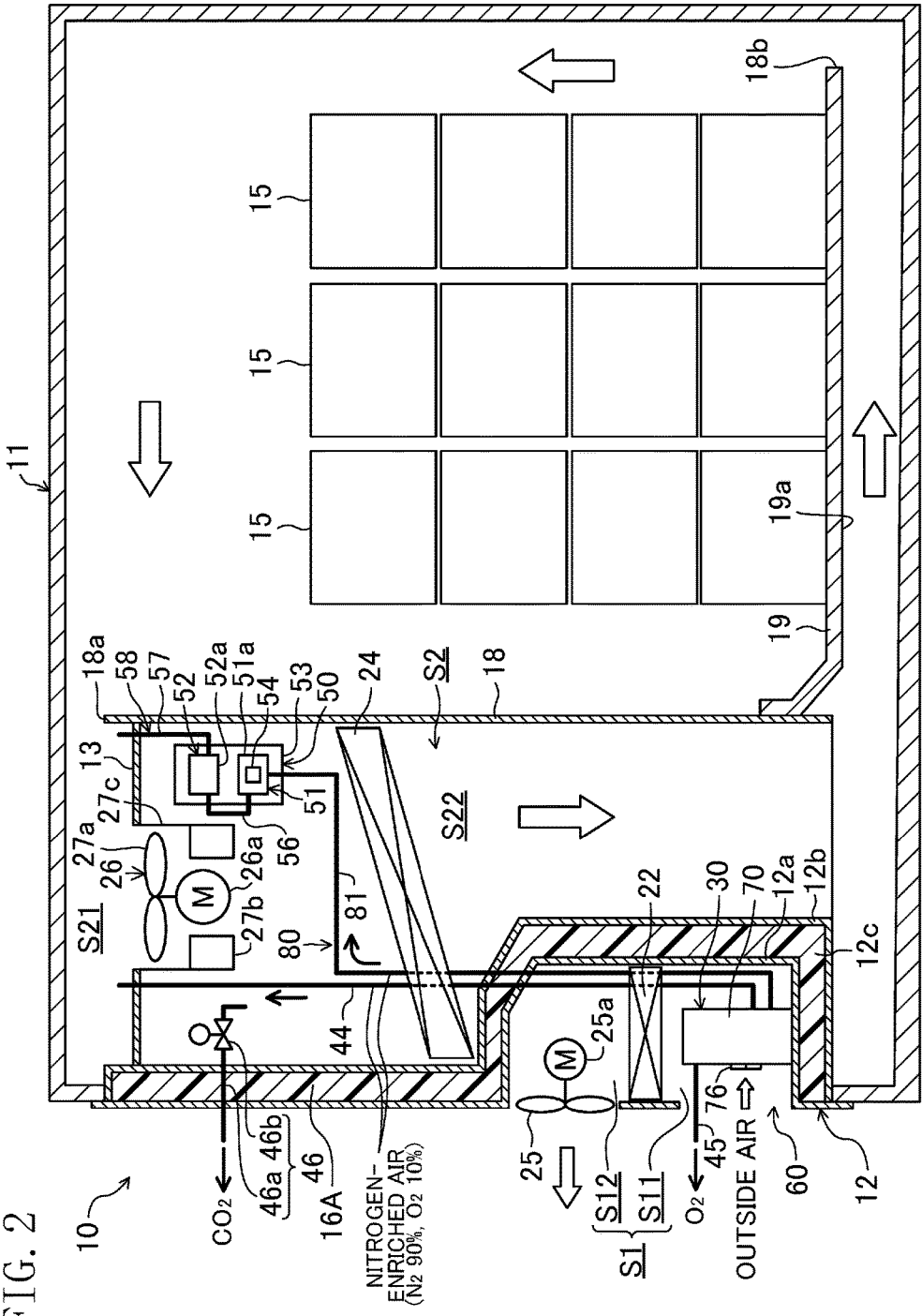
FIG. 2 is a cross-sectional view illustrating a general configuration of the container refrigeration apparatus of the first embodiment.

As shown in FIGS. 1 and 2, a container refrigeration apparatus (10) is provided for a container (11) for use in, e.g., marine transportation, and cools the air in the container (11). Boxed plants (15) are stored in the container (11). The plants (15) breathe by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere system (CA system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) partitions the internal storage space (S2) vertically such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the container (11) is provided at an end of the floorboard (19) opposite from the open end of the container (11) (on the right side in FIG. 2).

<Refrigerant Circuit>

Figure 3:
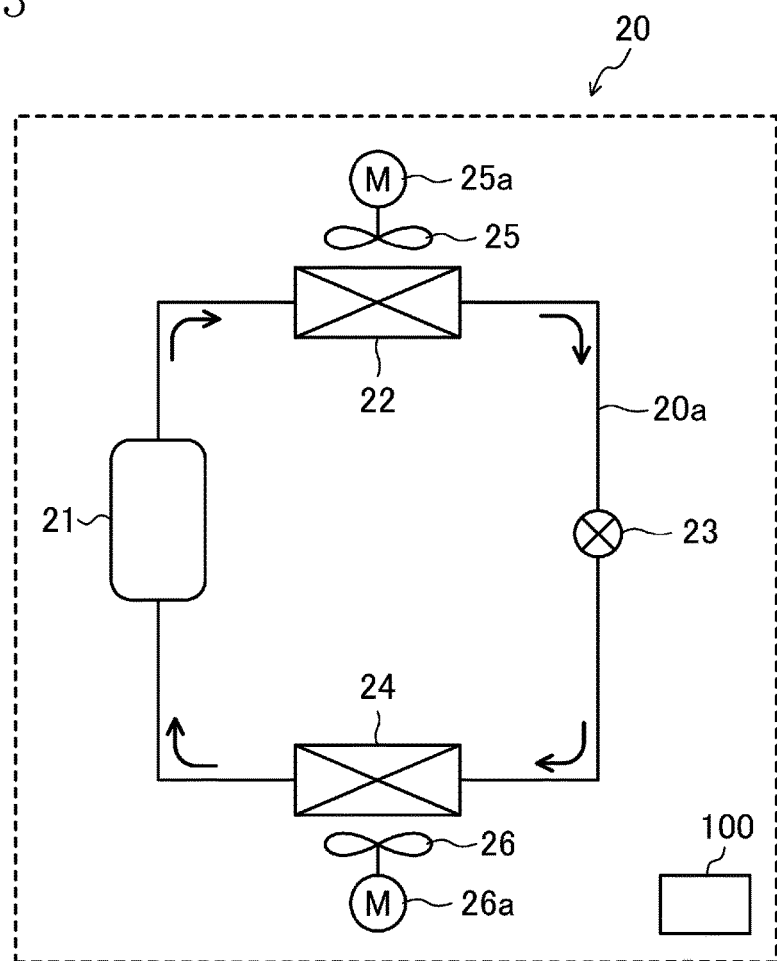
FIG. 3 is a piping diagram illustrating a configuration of a refrigerant circuit in the container refrigeration apparatus of the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent from the external fan (25) to the condenser (22). In this embodiment, the external fan (25) is comprised of a propeller fan.

Two internal fans (26) are disposed near the evaporator (24). The internal fans (26) are driven in rotation by internal fan motors (26a), and guide the air in the container (11) through a suction port (18a) to blow the air toward the evaporator (24). In the evaporator (24), heat is exchanged between a refrigerant flowing through the evaporator (24) and having its pressure decreased by the expansion valve (23) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) is disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior space of the container (11). A plate member is arranged to close the second space (S12) from the exterior space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
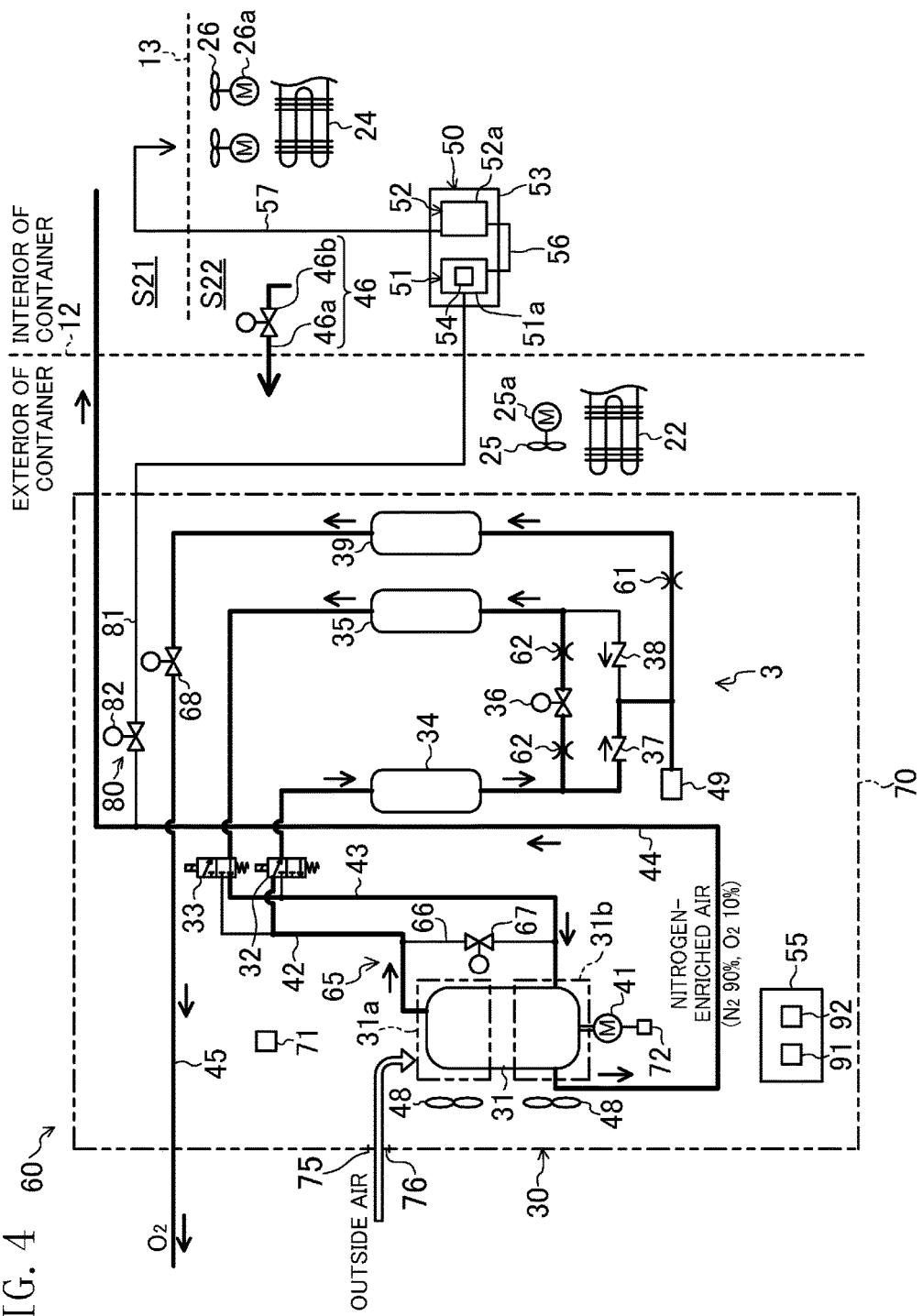
FIG. 4 is a piping diagram illustrating the configuration of the CA system in the container refrigeration apparatus of the first embodiment, together with the flow of air during a first flow state.

As shown in FIG. 4, the CA system (60) includes a gas supply device (30), an exhaust portion (46), a sensor unit (50), a measurement unit (80), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting an air pump (31), first and second directional control valves (first and second solenoid valves) (32) and (33), first and second adsorption columns (34) and (35) each provided with an adsorbent for adsorbing nitrogen in the air, and an oxygen tank (39), and a unit case (70) housing these components of the air circuit (3). In this manner, the gas supply device (30) forms a single unit with these components housed in the unit case (70), and is configured to be retrofitted to the container refrigeration apparatus (10). A temperature sensor (71) is provided in the unit case (70) for measuring the temperature of the interior of the unit case (70).

(Air Pump)

The air pump (31) is provided in the unit case (70), and includes first and second pump mechanisms (31a) and (31b), each of which sucks and compresses the air to discharge compressed air. The first and second pump mechanisms (31a) and (31b) are connected to a driving shaft of a motor (41), and are driven in rotation by the motor (41) to suck and compress the air, and discharge the compressed air. The motor (41) is provided with an ammeter (72) which measures the current flowing through the motor (41).

An inlet of the first pump mechanism (31a) opens in the unit case (70), and an air-permeable, waterproof membrane filter (76) is provided for an air inlet (75) of the unit case. Thus, the first pump mechanism (31a) sucks and compresses the outside air from which moisture has been removed when flowing from the outside to inside of the unit case (70) through the membrane filter (76) provided for the air inlet (75). On the other hand, an outlet of the first pump mechanism (31a) is connected to one end of a discharge passage (42). The other end (downstream end) of the discharge passage (42) is divided into two branches, which are connected to the first directional control valve (32) and the second directional control valve (33), respectively.

An inlet of the second pump mechanism (31b) is connected to one end of a suction passage (43). The other end (upstream end) of the suction passage (43) is divided into two branches, which are connected to the first and second directional control valves (32) and (33), respectively. On the other hand, an outlet of the second pump mechanism (31b) is connected to one end of a supply passage (44). The other end of the supply passage (44) opens in the first space (S21) on the suction side of the internal fans (26) in the internal storage space (S2) of the container (11).

The first and second pump mechanisms (31a) and (31b) of the air pump (31) are configured as oil-free pumps without lubricant oil. Specifically, suppose that oil is used in the pump of the first pump mechanism (31a). In such a situation, when the first and second adsorption columns (34) and (35) are pressurized by being supplied with the compressed air, the oil included in the compressed air is adsorbed onto the adsorbent, resulting in a decreased adsorption performance of the adsorbent.

On the other hand, if oil is used in the pump of the second pump mechanism (31b), the oil is supplied to the interior of the container (11) together with the nitrogen-enriched air containing nitrogen desorbed from the first and second adsorption columns (34) and (35). That is to say, in that case, the nitrogen-enriched air with an oily smell is supplied to the interior of the container (11) loaded with plants (15).

Thus, this embodiment is configured to overcome such a disadvantage by implementing the first and second pump mechanisms (31a) and (31b) of the air pump (31) as oil-free pumps.

Two blower fans (48) are disposed on the side of the air pump (31) to cool the air pump (31) by blowing air to the air pump (31).

(Directional Control Valve)

The first and second directional control valves (32) and (33) are provided in the air circuit (3) between the air pump (31) and the first and second absorption columns (34) and (35), and switches the connection between the air pump (31) and the first and second absorption columns (34) and (35) among first to fourth connection states. The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and the top of the first adsorption column (34). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a). In this embodiment, the first directional control valve (32) is configured as a solenoid valve which, when not energized, is in the first state, and switched to the second state when energized.

The second directional control valve (33) is connected to the discharge passage (42) connected to the outlet of the first pump mechanism (31a), the suction passage (43) connected to the inlet of the second pump mechanism (31b), and the top of the second adsorption column (35). This second directional control valve (33) switches between a first state where the second adsorption column (35) is allowed to communicate with the inlet of the second pump mechanism (31b) to be blocked from the outlet of the first pump mechanism (31a) (the state shown in FIG. 4), and a second state where the second adsorption column (35) is allowed to communicate with the outlet of the first pump mechanism (31a) to be blocked from the inlet of the second pump mechanism (31b). In this embodiment, the second directional control valve (33) is configured as a solenoid valve which, when not energized, is in the second state, and switched to the first state when energized.

When the first directional control valve (32) is not energized and the second directional control valve (33) is energized, the first and second directional control valves (32) and (33) are both set to be the first state. As a result, the air circuit (3) is switched to the first connection state where the outlet of the first pump mechanism (31a) is connected to the first adsorption column (34), and the inlet of the second pump mechanism (31b) is connected to the second adsorption column (35). In this state, an adsorption operation is performed on the first adsorption column (34) to adsorb nitrogen in the outside air onto the adsorbent, and a desorption operation is performed on the second adsorption column (35) to desorb nitrogen adsorbed onto the adsorbent.

When the first directional control valve (32) is energized and the second directional control valve (33) is not energized, the first and second directional control valves (32) and (33) are both set to be the second state. As a result, the air circuit (3) is switched to the second connection state where the outlet of the first pump mechanism (31a) is connected to the second adsorption column (35), and the inlet of the second pump mechanism (31b) is connected to the first adsorption column (34). In this state, the adsorption operation is performed on the second adsorption column (35), and the desorption operation is performed on the first adsorption column (34).

When both of the first and second directional control valves (32) and (33) are not energized, the first directional control valve (32) is set to be the first state, and the second directional control valve (33) is set to be the second state. As a result, the air circuit (3) is switched to the third connection state where both of the first and second adsorption columns (34) and (35) are connected to the outlet of the first pump mechanism (31a). In this state, the first pump mechanism (31a) supplies the compressed outside air to both of the first and second adsorption columns (34) and (35). In other words, the third connection state is a dual pressurization state in which both of the first and second adsorption columns (34) and (35) are pressurized by the first pump mechanism (31a). In this state, a desorption operation is performed in both of the first and second adsorption columns (34) and (35).

When both of the first and second directional control valves (32) and (33) are energized, the first directional control valve (32) is set to be the second state, and the second directional control valve (33) is set to be the first state. As a result, the air circuit (3) is switched to the fourth connection state where both of the first and second adsorption columns (34) and (35) are connected to the inlet of the second pump mechanism (31b). In this state, the second pump mechanism (31b) sucks the air in both of the first and second adsorption columns (34) and (35). In other words, the fourth connection state is a dual depressurization state in which both of the first and second adsorption columns (34) and (35) are depressurized by the second pump mechanism (31b). In this state, a desorption operation is performed in both of the first and second adsorption columns (34) and (35).

In this embodiment, the first and second directional control valves (32) and (33) form a switching mechanism according to the present invention.

(Adsorption Column)

The first and second adsorption columns (34) and (35) are configured as cylindrical members filled with an adsorbent, and are disposed upright (i.e., disposed such that each axis direction thereof is a vertical direction). The adsorbent that fills the first and second adsorption columns (34) and (35) absorbs nitrogen in a state where the adsorption columns (34, 35) are pressurized, and desorbs nitrogen in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. Nitrogen in the air may be absorbed by using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with nitrogen as a result of the desorption operation. Consequently, nitrogen-enriched air including moisture is supplied to the interior of the container (11), thus increasing the humidity in the container (11). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), nitrogen in the outside air is adsorbed onto the adsorbent. This produces oxygen-enriched air that has had its nitrogen concentration lowered and oxygen concentration increased by including less nitrogen than the outside air does. On the other hand, if the air pump (31) sucks the air from the first and second adsorption columns (34) and (35) to depressurize these columns (34) and (35), the nitrogen adsorbed onto the adsorbent is desorbed. This produces nitrogen-enriched air that has had its nitrogen concentration increased and oxygen concentration lowered by including more nitrogen than the outside air does. In this embodiment, this nitrogen-enriched air may be 90% nitrogen and 10% oxygen, for example.

The respective lower ends of the first and second adsorption columns (34) and (35) (functioning as outlets during pressurization and inlets during depressurization) are connected to one end of an oxygen exhaust passage (45) through which the oxygen-enriched air that has been produced in the first and second adsorption columns (34) and (35) being supplied with the compressed outside air by the first pump mechanism (31a) is guided toward the outside of the container (11). The one end of the oxygen exhaust passage (45) is divided into two branches, which are connected to the lower ends of the first and second adsorption columns (34) and (35), respectively. The other end of the oxygen exhaust passage (45) opens outside the gas supply device (30), i.e., outside the container (11). One of the two branches of the one end of the oxygen exhaust passage (45), i.e., the one connected to the lower end of the first adsorption column (34), is provided with a first check valve (37) which prevents backflow of the air from the oxygen exhaust passage (45) to the first adsorption column (34). The other branch of the oxygen exhaust passage (45) connected to the lower end of the second adsorption column (35) is provided with a second check valve (38) which prevents backflow of the air from the oxygen exhaust passage (45) to the second adsorption column (35).

The two branches of the one end of the oxygen discharge passage (45) are connected with each other via a purge valve (36), and an orifice (62) is provided between the purge valve (36) and each of the branches. The purge valve (36) is used to introduce a predetermined amount of the oxygen-enriched air into an adsorption column being depressurized (the second adsorption column (35) in FIG. 4) from an adsorption column being pressurized (the first adsorption column (34) in FIG. 4) to support the release of nitrogen from the adsorbent of the adsorption columns (35, 34) being depressurized. The controller (55) controls an opening/closing operation of the purge valve (36).

The oxygen tank (39) is provided at some midpoint of the oxygen exhaust passage (45), and an orifice (61) is provided between the oxygen tank (39) and the first and second check valves (37) and (38). The oxygen tank (39) temporarily retains the oxygen-enriched air produced in the first and second adsorption columns (34) and (35). The oxygen-enriched air produced in the first and second adsorption columns (34) and (35) is depressurized by the orifice (61), and is then temporarily retained in the oxygen tank (39).

A pressure sensor (49) which measures the pressure in the oxygen discharge passage (45) is connected between the orifice (61) of the oxygen exhaust passage (45) and the first and second check valves (37) and (38).

(Flow Switching Mechanism)

The air circuit (3) further includes a flow switching mechanism (65) which switches the state of flow of the air in the air circuit (3) between a first flow state where the nitrogen-enriched air produced in the first and second adsorption columns (34) and (35) is supplied into the container (11) by the air pump (31), and a second flow state where the outside air taken into the air circuit (3) is supplied into the container (11) by the air pump (31).

In this embodiment, the flow switching mechanism (65) includes a bypass passage (66), a bypass open/close valve (67), and an exhaust passage open/close valve (68). The bypass passage (66) connects the discharge passage (42) and the suction passage (43). The bypass open/close valve (67) is provided in the bypass passage (66). The exhaust passage open/close valve (68) is provided in the oxygen discharge passage (45) so as to be closer to the exterior of the gas supply device (30) than the oxygen tank (39), i.e., provided outside the container (11).

Figure 5:
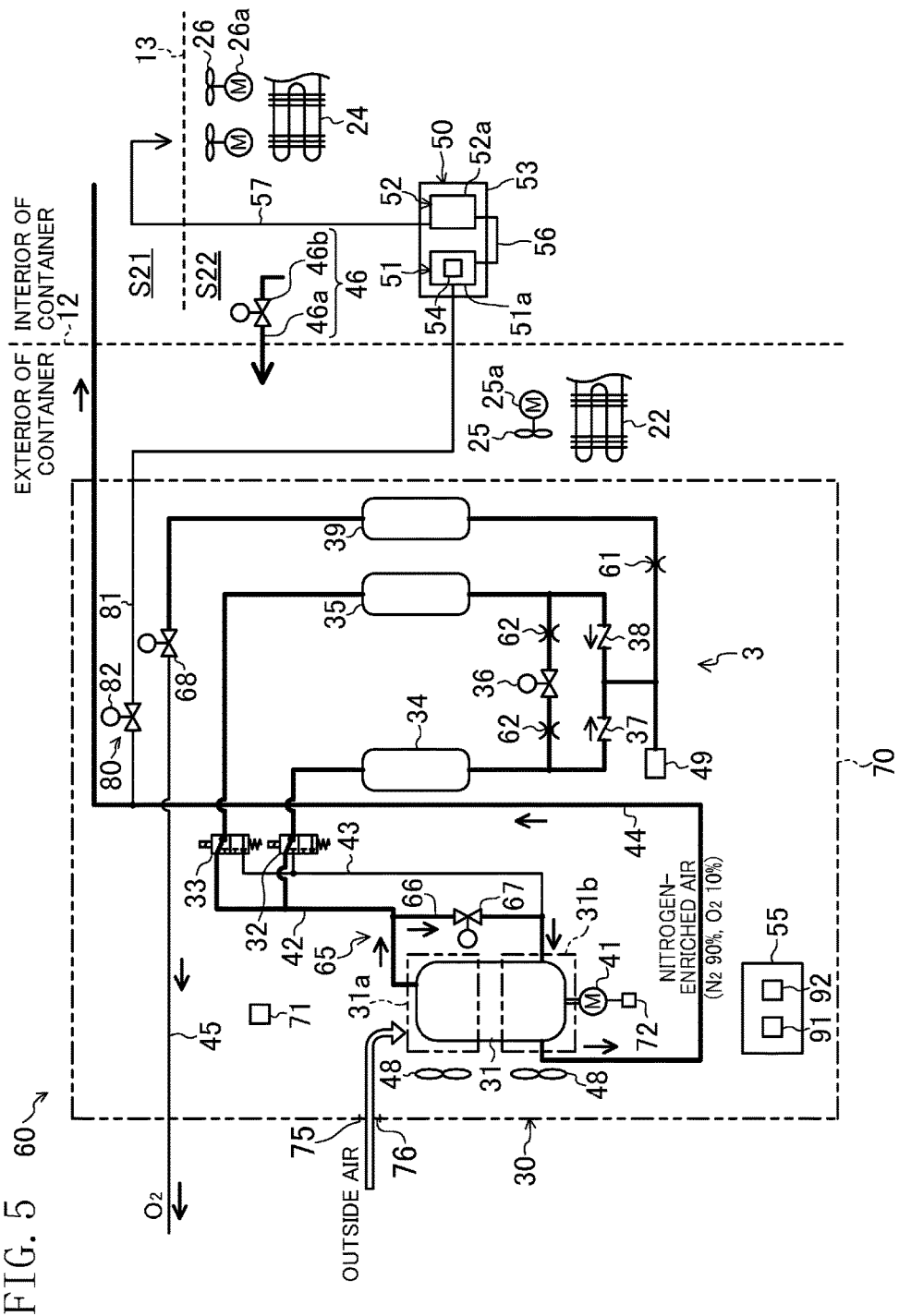
FIG. 5 is a piping diagram illustrating the configuration of the CA system in the container refrigeration apparatus of the first embodiment, together with the flow of air during a second flow state.

The controller (55) controls an opening/closing operation of the bypass open/close valve (67) and the exhaust passage open/close valve (68). Although particular behaviors will be described later, the flow state of the air in the air circuit (3) is switched to the first flow state (the state shown in FIG. 4) by closing the bypass open/close valve (67) and opening exhaust passage open/close valve (68) by the controller (55). On the other hand, the flow state of the air in the air circuit (3) is switched to the second flow state (the state shown in FIG. 5) by opening the bypass open/close valve (67) and closing the exhaust passage open/close valve (68) by the controller (55).

In this embodiment, by switching the flow state of the air in the air circuit (3) to the first flow state (the state shown in FIG. 4), the gas supply device (30) turns to a first supply state supplying, as supply air, the nitrogen-enriched air produced in the first and second adsorption column (34) and (35) from the outside air, into the container (11) through the supply passage (44). On the other hand, by switching the flow state of the air in the air circuit (3) to the second flow state (the state shown in FIG. 5), the gas supply device (30) turns to a second supply state in which the gas supply device (30) takes outside air, and supplies, as supply air, the outside air into the container (11) through the supply passage (44).

—Operation Mechanism of Gas Supply Device—

The supply states of the gas supply device (30) are switched between the first supply state supplying, as supply air, the nitrogen-enriched air produced from the outside air into the container (11), and the second supply state in which the gas supply device (30) takes outside air and supplies, as supply air, the outside air into the container (11).

<<Operation in First Supply State>>

The controller (55) switches the flow state of the air in the air circuit (3) to the first flow state, thereby switching the supply state of the gas supply device (30) to the first supply state.

Specifically, the controller (55) operates the air pump (31) with the bypass open/close valve (67) closed and the exhaust passage open/close valve (68) open. The controller (55) controls the first and second directional control valves (32) and (33) such that the connection state between the air pump (31) and the first and second adsorption columns (34) and (35) is switched alternately between the first connection state and the second connection state at predetermined intervals (e.g., every fifteen seconds). In the first connection state, a first operation is performed in which the first adsorption column (34) is pressurized, whereas the second adsorption column (35) is depressurized. On the other hand, in the second connection state, a second operation is performed in which the first adsorption column (34) is depressurized, whereas the second adsorption column (35) is pressurized.

<<First Operation>>

In the first operation, the first directional control valve (32) is not energized and the second directional control valve (33) is energized by the control of the controller (55). As a result, the first and second directional control valves (32) and (33) are both switched to the first state illustrated in FIG. 4. Thus, the air circuit (3) is set to the first connection state where the first adsorption column (34) communicates with the outlet of the first pump mechanism (31a) and is blocked from the inlet of the second pump mechanism (31b), and the second adsorption column (35) communicates with the inlet of the second pump mechanism (31b) and is blocked from the outlet of the first pump mechanism (31a).

The first pump mechanism (31a) supplies the compressed outside air to the first adsorption column (34). Nitrogen contained in the air which has flowed into the first adsorption column (34) is adsorbed on the adsorbent of the first adsorption column (34). Thus, during the first operation, the compressed outside air is supplied from the first pump mechanism (31a) to the first adsorption column (34), in which the adsorbent adsorbs nitrogen in the outside air, thereby producing the oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31b) sucks the air from the second adsorption column (35). Simultaneously, the second pump mechanism (31b) also sucks nitrogen adsorbed onto the adsorbent in the second adsorption column (35) together with the air, thereby allowing the adsorbent to desorb nitrogen. Thus, during the first operation, the second pump mechanism (31b) sucks the air out of the second adsorption column (35) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

<<Second Operation>>

In the second operation, the first directional control valve (32) is energized and the second directional control valve (33) is not energized by the control of the controller (55). As a result, the first and second directional control valves (32) and (33) are both switched to the second state opposite to the state illustrated in FIG. 4. Thus, the air circuit (3) is set to the second connection state where the first adsorption column (34) communicates with the inlet of the second pump mechanism (31b) and is blocked from the outlet of the first pump mechanism (31a), whereas the second adsorption column (35) communicates with the outlet of the first pump mechanism (31a) and is blocked from the inlet of the second pump mechanism (31b).

The first pump mechanism (31a) supplies the compressed outside air to the second adsorption column (35). Nitrogen contained in the air flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs nitrogen in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks nitrogen adsorbed onto the adsorbent in the first adsorption column (34) together with the air, thereby allowing the adsorbent to desorb nitrogen. Thus, during the second operation, the second pump mechanism (31b) sucks the air out of the first adsorption column (34) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

In this manner, the gas supply device (30) alternately repeats the first and second operations to produce the nitrogen-enriched air and the oxygen-enriched air in the air circuit (3). Further, in the first flow state, the bypass open/close valve (67) is closed and the exhaust passage open/close valve (68) is open. Thus, oxygen-enriched air produced in the first and second adsorption columns (34) and (35) is exhausted out of the container (11) via the oxygen exhaust passage (45) by the pressure applied by the first pump mechanism (31a) of the air pump (31), while the nitrogen-enriched air produced in the first and second adsorption columns (34) and (35) is supplied into the container (11) via the supply passage (44) by the pressure applied by the second pump mechanism (31b) of the air pump (31).

In this manner, in the first flow state, a gas supply operation is performed in which the nitrogen-enriched air produced in the first and second adsorption columns (34) and (35) is supplied into the container (11) by the pressure applied by the second pump mechanism (31b) of the air pump (31). That is, the gas supply device (30) is set to the first supply state supplying, as supply air, the nitrogen-enriched air produced from the outside air into the container (11) via the supply passage (44).

<<Operation in Second Supply State>>

The controller (55) switches the flow state of the air in the air circuit (3) to the second flow state, thereby switching the supply state of the gas supply device (30) to the second supply state.

Specifically, the controller (55) controls the first and second directional control valves (32) and (33) with the bypass open/close valve (67) open and the exhaust passage open/close valve (68) closed, thereby switching the connection state between the air pump (31) and the first and second adsorption columns (34) and (35) to the third connection state (i.e., the dual pressurization state) in which both of the first and second adsorption columns (34) and (35) are connected to the outlet of the first pump mechanism (31a). Then, the air pump (31) is operated.

In the second flow state, the compressed outside air is supplied to both of the first and second adsorption columns (34) and (35) by the first pump mechanism (31a). An adsorption operation is performed in both of the first and second adsorption columns (34) and (35) to produce oxygen-enriched air.

In the second flow state, the bypass open/close valve (67) is open, and the exhaust passage open/close valve (68) is closed. Thus, even if the compressed outside air is supplied to the first and second adsorption columns (34) and (35), and the oxygen-enriched air is produced, the oxygen-enriched air will not be exhausted outside (i.e., to the outside of the container (11)). Thus, soon after the flow state is switched to the second flow state, the internal pressure between the junction of the discharge passage (42) with the bypass passage (66) and the exhaust passage open/close valve (68) of the oxygen discharge passage (45) increases significantly. As a result, the outside air compressed by the first pump mechanism (31*a*) does not flow toward the first and second adsorption columns (34) and (35).

Thus, the outside air compressed by the first pump mechanism (31*a*) flows into the bypass passage (66) from the discharge passage (42), bypasses the first and second adsorption columns (34) and (35), flows into the suction passage (43), and is sucked into the second pump mechanism (31*b*). That is, the outside air compressed by the first pump mechanism (31*a*) is sucked directly into the second pump mechanism (31*b*). The outside air which has been sucked into the second pump mechanism (31*b*) is compressed and supplied into the container via the supply passage (44).

In this manner, in the second flow state, an outside air introduction operation is performed in which the outside air which has been taken into the air circuit (3) is directly supplied into the container (11) by the pressure applied by the second pump mechanism (31*b*) of the air pump (31). That is, the gas supply device (30) is set to the second supply state supplying, as supply air, the outside air taken therein into the container (11) via the supply passage (44).

[Exhaust Portion]

As shown in FIG. 2, the exhaust portion (46) includes an exhaust passage (46*a*) connecting the internal storage space (S2) and the exterior space of the container, and an exhaust valve (46*b*) connected to the exhaust passage (46*a*). The exhaust passage (46*a*) passes through the casing (12) from the interior to exterior of the casing (12). The exhaust valve (46*b*) is provided adjacent to an internal end of the exhaust passage (46*a*), and is comprised of a solenoid valve which is switched between an open state where the air is allowed to flow through the exhaust passage (46*a*), and a closed state where the air is prevented from flowing through the exhaust tube (46*a*). The controller (55) controls an opening/closing operation of the exhaust valve (46*b*).

When the external fan (25) is rotating, an exhaust operation is performed in which the controller (55) opens the exhaust valve (46*b*) to exhaust the air (inside air) in the internal storage space (S2) communicating with the interior of the container out of the container.

Specifically, when the external fan (25) is rotating, the pressure of the second space (S22) on the blowout side becomes higher than the pressure of the exterior space of the container (i.e., the atmospheric pressure). Thus, when the exhaust valve (46*b*) is open, due to the pressure difference between the ends of the exhaust passage (46*a*) (the pressure difference between the external space of the container and the secondary space (S22)), the air in the internal storage space (S2) communicating with the interior of the container (inside air) is exhausted out of the container via the exhaust passage (46*a*).

[Sensor Unit]

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51*a*) housing a galvanic-cell sensor therein. The oxygen sensor (51) measures the value of a current flowing through an electrolytic solution of the galvanic cell-type sensor to measure the oxygen concentration of a gas in the oxygen sensor box (51*a*). An outer surface of the oxygen sensor box (51*a*) is fixed to the fixing member (53). Another outer surface of the oxygen sensor box (51*a*) opposite from the outer surface fixed to the fixing member (53) has an opening, to which the membrane filter (54), which is air-permeable and waterproof, is attached. Further, a branch pipe (81) of a measurement unit (80), which will be described later, is coupled via a connector (pipe joint) to a lower surface of the oxygen sensor box (51*a*). In addition, one end of the connection pipe (56) is coupled via a connector to one of the side surfaces of the oxygen sensor box (51*a*).

The carbon dioxide sensor (52) has a carbon dioxide sensor box (52*a*). The carbon dioxide sensor (52) is a non-dispersive infrared sensor which radiates infrared rays to the gas in the carbon dioxide sensor box (52*a*) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52*a*). Furthermore, one end of the exhaust pipe (57) is coupled via a connector to the other side surface of the carbon dioxide sensor box (52*a*).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51*a*) and the one side surface of the carbon dioxide sensor box (52*a*), and allows the internal space of the oxygen sensor box (51*a*) to communicate with the internal space of the carbon dioxide sensor box (52*a*).

As described above, the exhaust pipe (57) has one end coupled to the other side surface of the carbon dioxide sensor box (52*a*), and the other end open near the suction port of the internal fans (26). That is, the exhaust pipe (57) allows the internal space of the carbon dioxide sensor box (52*a*) to communicate with the primary space (S21) of the internal storage space (S2).

As can be seen, the secondary and primary spaces (S22) and (S21) of the internal storage space (S2) communicate with each other via an air passage (58) formed by the membrane filter (54), the internal space of the oxygen sensor box (51*a*), the connection pipe (56), the internal space of the carbon dioxide sensor box (52*a*), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the air sequentially flows from the interior of the container to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Measurement Unit]

The measurement unit (80) includes a branch pipe (81) and a measurement on-off valve (82), and is configured to diverge, and guide to the oxygen sensor (51), part of nitrogen-enriched air produced in the gas supply device (30) and passing through the supply passage (44).

Specifically, the branch pipe (81) has one end connected to the supply passage (44), and the other end coupled to the oxygen sensor box (51a) of the oxygen sensor (51). According to this configuration, the branch pipe (81) allows the supply passage (44) to communicate with the internal space of the oxygen sensor box (51a). In this embodiment, the branch pipe (81) is branched from the supply passage (44) in the unit case (70) and extends from the interior to exterior of the unit case (70).

The measurement on-off valve (82) is provided for the branch pipe (81) in the unit case. The measurement on-off valve (82) is comprised of a solenoid valve switching between an open state where the flow of nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

[Controller]

Figure 6:
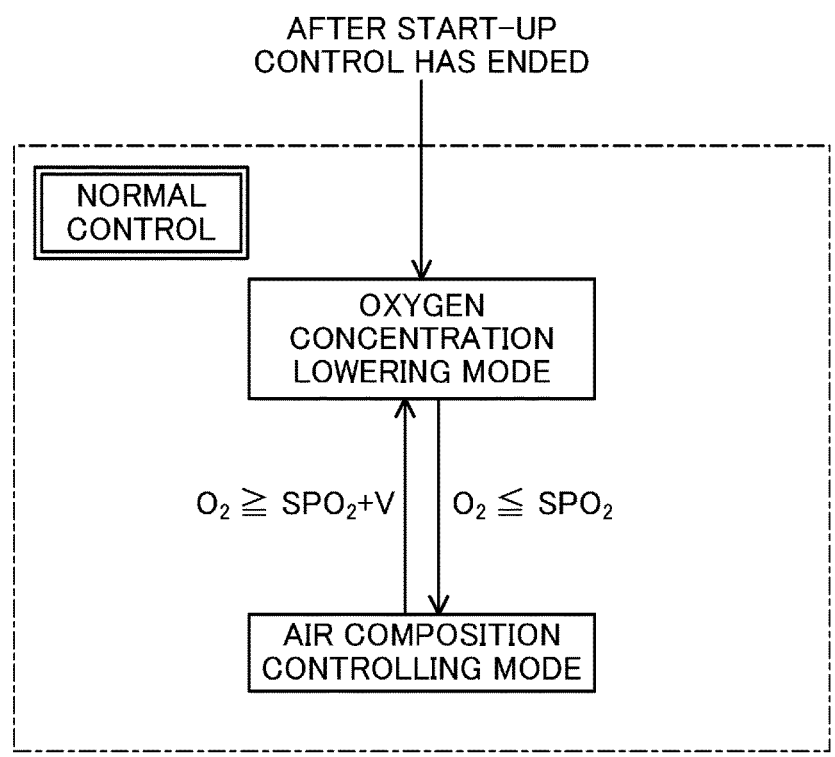
FIG. 6 illustrates how the mode is changed during normal control according to the first embodiment.

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 5% oxygen and 5% carbon dioxide). As shown in FIG. 6, in this embodiment, the controller (55) is configured to perform start-up control and normal control to carry out the concentration control operation. Further, the controller (55) is configured to perform the normal control after the predetermined start-up control has ended, and to perform control in an oxygen concentration lowering mode or an air composition controlling mode during the normal control.

In addition, the controller (55) is configured to control the operation of the measurement on-off valve (82) in accordance with a command entered by a user or periodically so as to perform a supply air measurement operation of measuring the oxygen concentration of the nitrogen-enriched air produced by the gas supply device (30).

Further, the controller (55) has a malfunction diagnosis section (91) and a malfunction notifier (92). The malfunction diagnosis section (91) is configured to perform a malfunction diagnosis operation when an oxygen concentration of the nitrogen-enriched air measured in the supply air measurement operation is not lower than or equal to a predetermined concentration. In the malfunction diagnosis operation, the malfunction diagnosis section (91) checks whether each of the components of the gas supply device (30) works properly or not, and specifies a malfunctioning portion. The malfunction notifier (92) is configured to display the malfunctioning portion specified by the malfunction diagnosis section (91) on a display section, e.g., a control panel (not shown).

—Operation—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

In this embodiment, the controller (55) shown in FIG. 4 instructs the CA system (60) to perform a concentration control operation of controlling the composition of the air in the container (11) (oxygen concentration and carbon dioxide concentration) to a desired composition (e.g., 5% oxygen and 5% carbon dioxide) based on the measurement results obtained by the oxygen sensor (51) and the carbon dioxide sensor (52). The controller (55) performs the concentration control operation by executing start-up control and normal control. During the normal control, the controller (55) performs the control in an oxygen concentration lowering mode or an air composition controlling mode so as to control the oxygen concentration and carbon dioxide concentration of the air in the container (11) to desired target concentrations SP, respectively.

During the concentration control operation, the controller (55) instructs the measurement on-off valve (82) to close. Further, during the concentration control operation, the controller (55) communicates with the unit controller (100) to instruct the unit controller (100) to rotate the internal fans (26). Thus, the air in the container is supplied to the oxygen sensor (51) and the carbon dioxide sensor (52) by the internal fans (26), and then the oxygen concentration and carbon dioxide concentration of the air in the container are measured.

Specifically, as shown in FIG. 6, the controller (55) performs the control in the oxygen concentration lowering mode during the normal control after the start-up control has ended. Then, if the oxygen concentration of the air in the container (11) measured by the oxygen sensor (51) is lowered to a target oxygen concentration $SPO_2$ (5% in this embodiment), the controller (55) finishes the control in the oxygen concentration lowering mode and starts the control in the air composition controlling mode. In the air composition controlling mode, if the oxygen concentration of the air in the container (11) measured by the oxygen sensor (51) reaches or exceeds a certain concentration (6.0% in this embodiment), which is the sum of the target oxygen concentration $SPO_2$ (5% in this embodiment) and a predetermined concentration V (1.0% in this embodiment), the controller (55) finishes the control in the air composition controlling mode and returns to the oxygen concentration lowering mode. The oxygen concentration lowering mode and air composition controlling mode under the normal control will be described in detail below.

[Oxygen Concentration Lowering Mode]

Figure 7:
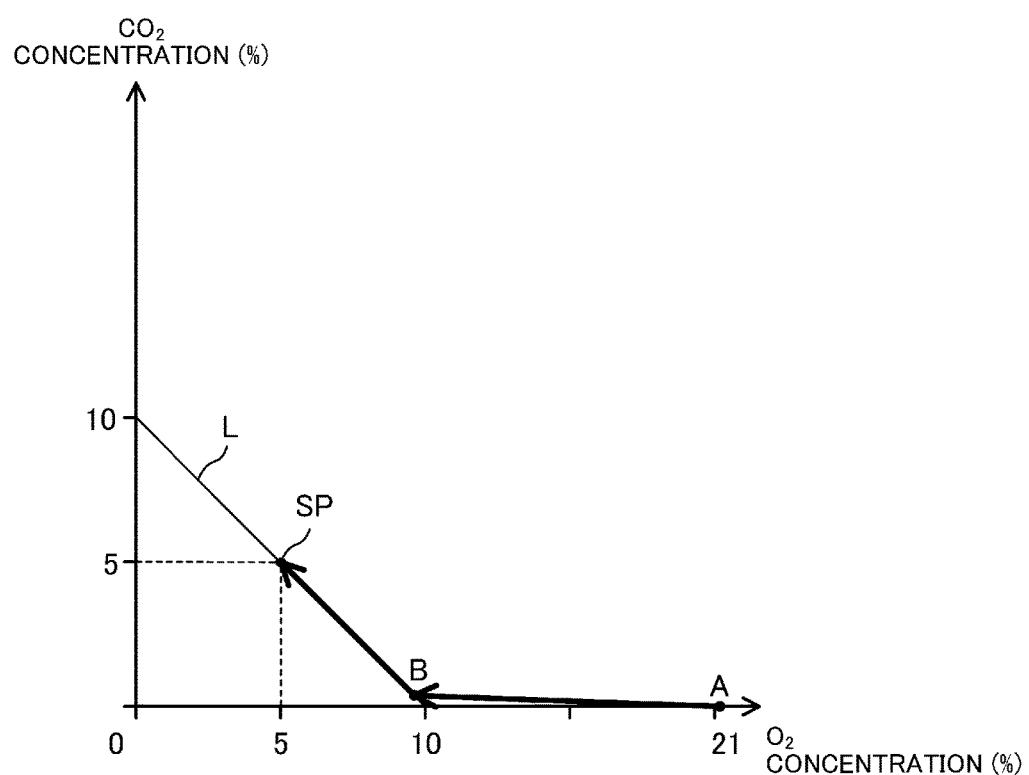
FIG. 7 is a graph illustrating how the composition of the air in a container changes during a concentration control operation in the container refrigeration apparatus of the first embodiment.

In the oxygen concentration lowering mode, first, the controller (55) switches the air circuit (3) to the first flow state, and performs a gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the oxygen concentration of the air in the container is lowered (from point A to point B in FIG. 7).

When the sum of the oxygen concentration and carbon dioxide concentration of the air in the container (11) reaches the sum of the target concentrations, i.e., the sum of the target oxygen concentration $SPO_2$ and the target carbon dioxide concentration $SPCO_2$ (reaches the point B in FIG. 7), the controller (55) stops the gas supply operation and the exhaust operation.

When the gas supply operation and the exhaust operation are stopped, the air in the container (11) is no longer replaced. Therefore, the composition of the air in the container changes only due to the breathing of the plants (15). Through the breathing, the plants (15) take oxygen in, and release the same volume of carbon dioxide as the oxygen taken in. Thus, as the plants (15) respire, the oxygen concentration of the air in the container (11) decreases, and the carbon dioxide concentration increases by the amount of decrease of the oxygen concentration, with the sum of the oxygen concentration and carbon dioxide concentration of the air in the container remaining unchanged. Thus, after the gas supply operation and the exhaust operation have been stopped, the composition of the air in the container (11) changes, as a result of the breathing of the plants (15), along the straight line L having an inclination of −1 and passing the target composition point SP (where the oxygen concentration is 5% and the carbon dioxide concentration is 5%) in a direction in which the oxygen concentration decreases and the carbon dioxide concentration increases. That is, after the gas supply operation and the exhaust operation have been stopped at an arbitrary point on the straight line L, the composition of the air in the container (11) may be controlled to the target composition only by making use of the breathing of the plants (15).

Thereafter, when the oxygen concentration of the air in the container decreases to the target oxygen concentration $SPO_2$ (5% in this embodiment) or lower, the controller (55) finishes the control in the oxygen concentration lowering mode, and starts the control in the air composition controlling mode.

[Air Composition Controlling Mode]
<<Control of Oxygen Concentration>>

In the air composition controlling mode, the controller (55) performs oxygen concentration increasing control of increasing the oxygen concentration of the air in the container if the oxygen concentration of the air in the container falls below a lower limit value (4.5% in this embodiment), which is lower than the target oxygen concentration $SPO_2$ (5% in this embodiment) only by the predetermined concentration X (0.5% in this embodiment).

In the oxygen concentration increasing control, the controller (55) switches the air circuit (3) to the second flow state, and performs an outside air introduction operation of supplying the outside air taken in the air circuit (3) to the interior of the container (11). Simultaneously, the controller (55) instructs the exhaust valve (46b) of the exhaust portion (46) to open to perform the exhaust operation, so that the air in the container is exhausted out of the container only by the amount of the outside air supplied to the interior of the container (11) during the outside air introduction operation. Through the outside air introduction operation and exhaust operation thus performed, the air in the container is replaced with the outside air, and thus, the oxygen concentration of the air in the container (11) increases.

If the oxygen concentration of the air in the container reaches or exceeds a certain value (5.5% in this embodiment) which is higher than the target oxygen concentration $SPO_2$ (5% in this embodiment) only by the predetermined concentration X (0.5% in this embodiment), the controller (55) stops the outside air introduction operation and the exhaust operation. Thus, the oxygen concentration increasing control ends.

<<Control of Carbon Oxide Concentration>>

Further, in the air composition controlling mode, the controller (55) performs carbon dioxide concentration lowering control to lower the carbon dioxide concentration of the air in the container if the carbon dioxide concentration of the air in the container reaches or exceeds an upper limit value (5.5% in this embodiment), which is higher than the target carbon dioxide concentration $SPCO_2$ (5% in this embodiment) only by the predetermined concentration Y (0.5% in this embodiment).

During the carbon dioxide concentration lowering control, the controller (55) first switches the air circuit (3) to the first flow state, and performs the gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the carbon dioxide concentration of the air in the container (11) is lowered.

If the carbon dioxide concentration of the air in the container falls below a certain value (4.5% in this embodiment) which is lower than the target carbon dioxide concentration $SPCO_2$ (5% in this embodiment) only by the predetermined concentration Y (0.5% in this embodiment), the controller (55) stops the gas supply operation and the exhaust operation, and ends the carbon dioxide concentration lowering control.

Note that, in the carbon dioxide concentration lowering control, the gas supply operation may be replaced with the outside air introduction operation of supplying the outside air taken into the air circuit (3) to the interior of the container (11), with the air circuit (3) being switched to the second flow state.

[Supply Air Measurement Operation]

Further, the controller (55) performs a supply air measurement operation of measuring the oxygen concentration of the nitrogen-enriched air produced in the gas supply device (30) in accordance with a command entered by a user or periodically (e.g., every ten days). Note that the supply air measurement operation is performed concurrently when the internal fans (26) are stopped during a gas supply operation for the concentration control operation described above or test run.

Specifically, the controller (55) instructs the measurement on-off valve (82) to open during the gas supply operation, that is, while the gas supply device (30) is in the first supply state in which the nitrogen-enriched air produced from the outside air in the first and second adsorption columns (34) and (35) is supplied into the controller (11). When the measurement on-off valve (82) is opened during the gas supply operation, part of the nitrogen-enriched air passing through the supply passage (44) flows into the branch pipe (81). The nitrogen-enriched air that has flowed into the branch pipe (81) flows into the oxygen sensor box (51a) which forms part of the air passage (58). The oxygen sensor (51) then measures the oxygen concentration of the nitrogen-enriched air.

If the oxygen concentration of the nitrogen-enriched air produced in the gas supply device (30) is measured in this way, it may be determined whether or not the composition of the nitrogen-enriched air produced in the gas supply device (30) (oxygen concentration and nitrogen concentration) is in a desired state (consisting of 90% nitrogen and 10% oxygen, for example).

[Malfunction Diagnosis Operation]

The malfunction diagnosis section (91) of the controller (55) checks whether each of the components of the gas supply device (30) works properly or not and specifies a malfunctioning portion when the oxygen concentration of the nitrogen-enriched air measured in the supply air measurement operation does not fall to or below a predetermined concentration.

(Diagnosis Operation for Air Pump and Motor)

The malfunction diagnosis section (91) first checks whether the air pump (31) and the motor (41) work properly or not.

Specifically, the malfunction diagnosis section (91) stores a temperature of the interior of the unit case (70) measured by the temperature sensor (71) in a state in which the gas supply device (30) is stopped, and starts the operation of the air pump (31). After a lapse of predetermined time since the start of operation of the air pump (31), the malfunction diagnosis section (91) compares the temperature measured by the temperature sensor (71) with the temperature of the interior of the unit case (70) stored before the start of operation. If the temperature of the interior of the unit case (70) after the start of operation is higher than the temperature thereof before the start of operation, the malfunction diagnosis section (91) determines that the air pump (31) and the motor (41) work properly. On the other hand, if the temperature of the interior of the unit case (70) after the start of operation is not higher than the temperature thereof before the start of operation, the malfunction diagnosis section (91) determines that the air pump (31) or the motor (41) does not work properly (or malfunctions).

If the malfunction diagnosis section (91) determines that the air pump (31) or the motor (41) does not work properly (or malfunctions), the malfunction diagnosis section (91) compares a value of a current of the motor (41) measured by the ammeter (72) with a predetermined normal range of the value of current of the motor (41). If the value of the current of the motor (41) is in the predetermined normal range, the malfunction diagnosis section (91) determines that the air pump (31) does not work properly (or malfunctions). On the other hand, if the value of the current of the motor (41) does not fall within the predetermined normal range, the malfunction diagnosis section (91) determines that the motor (41) does not work properly (or malfunctions).

(Diagnosis Operation for Switching Mechanism)

If the malfunction diagnosis section (91) determines that the air pump (31) and the motor (41) work properly, the malfunction diagnosis section (91) checks whether the switching mechanism (32, 33) works properly or not.

First, the malfunction diagnosis section (91) performs an energization operation in which the first and second directional control valves (32) and (33) are switched from a nonenergized state to an energized state simultaneously. The malfunction diagnosis section (91) determines whether the switching mechanism (32, 33) works properly or not, according to whether the difference in the pressure in the oxygen discharge passage (45) before and after the energization operation is more than or equal to a predetermined pressure value or not.

Specifically, the malfunction diagnosis section (91) starts the operation of the air pump (31) when the first and second directional control valves (32) and (33) are in the third connection state where both of these valves are not energized, and stores the pressure of the interior of the oxygen discharge passage (45) measured by the pressure sensor (49). Next, the malfunction diagnosis section (91) switches the first and second directional control valves (32) and (33) from the third connection state to the fourth connection state by changing the nonenergized state to the energized state simultaneously. In this state, the malfunction diagnosis section (91) compares the pressure in the oxygen discharge passage (45) measured by the pressure sensor (49) with the pressure in the oxygen discharge passage (45) stored before the switching to the fourth connection state.

In the third connection state, both of the first and second adsorption columns (34) and (35) are pressurized by the first pump mechanism (31a), which is called a dual pressurization state. In the dual pressurization state, the pressure in the oxygen discharge passage (45) is approximately the same as the pressure of the outside air compressed by the first pump mechanism (31a). On the other hand, when the connection state is switched to the fourth connection state, the dual pressurization state is changed to a dual depressurization state in which both of the first and second adsorption columns (34) and (35) are depressurized by the second pump mechanism (31b). In the dual depressurization state, no air flows out of the first and second adsorption columns (34) and (35) into the oxygen discharge passage (45). Thus, the pressure in the oxygen discharge passage (45) is approximately the same as the pressure of the outside air. Thus, if the switching mechanism (32, 33) works properly, the pressure in the oxygen discharge passage (45) drops through the energization operation.

Thus, the malfunction diagnosis section (91) determines that the switching mechanism (32, 33) works properly if the pressure in the oxygen discharge passage (45) drops by at least a predetermined pressure (e.g., 50 kPa) through the energization operation. On the other hand, the malfunction diagnosis section (91) determines that the switching mechanism (32, 33) does not work properly (or malfunctions) if the pressure in the oxygen discharge passage (45) does not drop by at least the predetermined pressure (e.g., 50 kPa) through the energization operation.

(Diagnosis Operation for Adsorbent)

The malfunction diagnosis section (91) checks whether the air pump (31), the motor (41), and the switching mechanism (32, 33) work properly or not, as described above. When it is determined that all of these components work properly, the malfunction diagnosis section (91) determines that the adsorbents in the first and second adsorption columns (34) and (35) do not work properly.

This malfunction diagnosis operation performed by the malfunction diagnosis section (91) specifies a malfunctioning portion of the gas supply device (30). After the malfunctioning portion of the gas supply device (30) is specified by the malfunction diagnosis section (91), the malfunction notifier (92) notifies the user of the malfunctioning portion. In this embodiment, an error code specifying the malfunctioning component is displayed on a display section (not shown) to notify the user of the malfunctioning portion. The malfunction notifier (92) may notify the user of the malfunctioning portion by sound such as voice or alarm, or through both of display and sound.

Advantages of First Embodiment

A malfunction caused by the performance degradation of the adsorbent is hard to be specified from the operational condition of the gas supply device (30). To address this difficulty, the present embodiment is configured to specify the malfunction from the result of a check of the air pump (31), the motor (41), and the switching mechanism (32, 33) because it is relatively easy to determine whether these components work properly or not. Specifically, whether each of the air pump (31), the motor (41), and the switching mechanisms (32, 33) works properly or not is checked. When it is determined all of these components work properly, it is determined that the adsorbents in the first and second adsorption columns (34) and (35) do not work properly. Thus, according to the present embodiment, a malfunction caused by the performance degradation of the adsorbent can be easily specified from the operational condition of the gas supply device (30). A drop in performance of the adsorbent can be detected in this manner, which may keep the adsorbent from being replaced wastefully, and allows the adsorbent to be replaced when it is necessary to be replaced because of a drop in the performance of the adsorbent.

Further, according to the present embodiment, since the air pump (31) and the motor (41) are housed in the unit case (70), whether the air pump (31) and the motor (41) work properly or not is determined based on whether the temperature in the unit case (70) increases or not after the start of the operation of the air pump (31). Thus, whether the air pump (31) and the motor (41) work properly or not can be easily determined.

Further, according to the present embodiment, in a case where it is determined that the air pump (31) or the motor (41) is malfunctioning, it is determined that the air pump (31) malfunctions if the value of the current of the motor (41) is in the normal range, and that the motor (41) malfunctions if the value of the current of the motor (41) does not fall within the normal range, because if the motor (41) works properly, the value of the current of the motor (41) falls within the normal range. This configuration does not require the provision of another pressure sensor to detect whether the air pump (31) works properly or not. Which of the air pump (31) or the motor (41) malfunctions can be easily determined by simply measuring the values of the current of the motor (41).

Further, according to the present embodiment, it is determined that the switching mechanism (32, 33) works properly if the difference in the pressure in the oxygen discharge passage (45) before and after the energization operation is more than or equal to a predetermined value, whereas it is determined that the switching mechanism (32, 33) malfunctions if the difference in said pressure before and after the energization operation is less than the predetermined value, because if the switching mechanism (32, 33) works properly, the difference in the pressure in the oxygen discharge passage (45) before and after the energization operation is more than or equal to the predetermined pressure. Thus, whether the switching mechanism (32, 33) works properly or not can be easily determined by simply detecting the pressure of the oxygen discharge passage (45).

Further, according to this embodiment, the malfunction notifier (92) notifies the user of a malfunctioning portion of the gas supply device (30) specified by the malfunction diagnosis section (91). Thus, the user is immediately notified of the malfunctioning portion of the gas supply device (30), prompted to replace that portion. As a result, the gas supply device (30) may continue to work properly. Therefore, the composition of the air in the container (11) may be accurately controlled to a desired composition.

Second Embodiment of the Invention

The second embodiment is a modified example of the container refrigeration apparatus (10) of the first embodiment. In the second embodiment, part of the malfunction diagnosis operation by the controller (55) (operation of checking the air pump (31) and the motor (41)) is modified. Operation of checking the air pump (31) and the motor (41) which is different from the operation according to the first embodiment will be described below.

(Diagnosis Operation for Air Pump and Motor)

The malfunction diagnosis section (91) first checks whether the air pump (31) and the motor (41) work properly or not.

Specifically, the malfunction diagnosis section (91) stores the pressure of the interior of the oxygen discharge passage (45) measured by the pressure sensor (49) in a state in which the gas supply device (30) is stopped, and starts the operation of the air pump (31). After a lapse of predetermined time since the start of operation, the malfunction diagnosis section (91) compares the pressure measured by the pressure sensor (49) with the pressure of the interior of the oxygen discharge passage (45) stored before the start of operation. If the pressure of the interior of the oxygen discharge passage (45) after the start of operation is higher than the pressure thereof before the start of operation, the malfunction diagnosis section (91) determines that the air pump (31) and the motor (41) work properly. On the other hand, if the pressure of the interior of the oxygen discharge passage (45) after the start of the operation is not higher than the pressure thereof before the start of the operation, the malfunction diagnosis section (91) determines that the air pump (31) or the motor (41) does not work properly (or malfunctions).

If the malfunction diagnosis section (91) determines that the air pump (31) or the motor (41) does not work properly (or malfunctions), the malfunction diagnosis section (91) compares a value of a current of the motor (41) measured by the ammeter (72) with a predetermined normal range of the value of current of the motor (41). If the value of the current of the motor (41) is in the predetermined normal range, the malfunction diagnosis section (91) determines that the air pump (31) does not work properly (or malfunctions). On the other hand, if the value of the current of the motor (41) does not fall within the predetermined normal range, the malfunction diagnosis section (91) determines that the motor (41) does not work properly (or malfunctions).

If the air pump (31) and the motor (41) work properly, the operation of the air pump (31) causes the first pump mechanism (31a) to compress the outside air. The compressed outside air is supplied into the first and second adsorption columns (34) and (35), where the compressed outside air is turned into oxygen-enriched air, which flows into the oxygen discharge passage (45). That is, the pressure in the oxygen discharge passage (45) is approximately the same as the pressure of the outside air compressed by the first pump mechanism (31a). On the other hand, no air flows into the oxygen discharge passage (45) before the start of operation of the air pump (31). Thus, the pressure in the oxygen discharge passage (45) which communicates with the outside is approximately the same as the pressure of the outside air. Thus, if the air pump (31) and the motor (41) work properly, the pressure in the oxygen discharge passage (45) increases after the start of operation of the air pump (31) from the pressure before the start of the operation of the air pump (31).

Further, in the second embodiment, whether the air pump (31) and the motor (41) work properly or not is determined according to whether or not the pressure in the oxygen discharge passage (45) increases after the start of operation of the air pump (31) from the pressure before the start of the operation of the air pump (31), because if the air pump (31) and the motor (41) work properly, the pressure in the oxygen discharge passage (45) becomes equal to the pressure of the outside air compressed by the first pump mechanism (31a), after the start of operation of the air pump (31). Thus, whether the air pump (31) and the motor (41) work properly or not can be easily determined.

Other Embodiments

The above-described embodiments may be modified in the following manner.

In the above embodiments, if the malfunction diagnosis section (91) determines that the performance of the adsorbents of the first and second adsorption columns (34) and (35) has deteriorated, the malfunction notifier (92) notifies the user that the adsorbents of the first and second adsorption columns (34) and (35) do not work properly. The interval of switching between the first and second operations by the controller (55) may be prolonged (e.g., may be changed from fifteen seconds to twenty seconds) prior to, or at the same time of, this notification by the malfunction notifier (92). This prolongation of switching extends the period of supplying outside air to the first and second adsorption columns (34, 35) by the first pump mechanism (31a), thereby increasing the pressure in the first and second adsorption columns (34, 35). The adsorption performance of the adsorbent increases with the increase in the pressure. This may compensate for the decrease in the adsorption performance.

In the above embodiments, the first and second directional control valves (32) and (33) are configured to be switched to the dual pressurization state when both of the valves are not energized, and to the dual depressurization state when both of the valves are energized. However, both of the first and second directional control valves (32) and (33) may be configured to be switched to the dual depressurization state when both of the valves are not energized, and to the dual pressurization state when both of the valves are energized. In this case, the malfunction diagnosis section (91) is configured to perform, in the diagnosis of the switching mechanism (32, 33), a switching operation of switching between the dual depressurization state, where the switching mechanism is not energized, and the dual pressurization state, where the switching mechanism is energized. If the pressure in the oxygen discharge passage (45) measured by the pressure sensor (49) after the switching operation is higher than the pressure before the switching operation by at least a predetermined pressure, the malfunction diagnosis section (91) determines that the switching mechanism (32, 33) works properly. If the increase in the pressure is less than the predetermined pressure after the switching operation, the malfunction diagnosis section (91) determines that the switching mechanism (32, 33) does not work properly (or malfunctions).

According to the above-described embodiments, a single air pump (31) has been configured to include the first and second pump mechanisms (31a) and (31b). However, the first and second pump mechanisms (31a) and (31b) may be configured as two separate air pumps.

Moreover, according to the above-described embodiments, two adsorption columns have been used as first and second adsorption portions, respectively, for adsorption and desorption of nitrogen. However, the number of the adsorption columns serving as a single adsorption portion is not limited to one. For example, each of the first and second adsorption portions may be comprised of three adsorption columns, i.e., six adsorption columns in total may be used.

In addition, according to the above-described embodiments, the CA system (60) of the present invention is applied to a container refrigeration apparatus (10) provided for a container (11) for use in marine transportation. However, the CA system (60) of the present invention is not limited to such applications. The CA system (60) of the present invention may be used to control the composition of the air in, not only a container for use in marine transportation, but also a container for use in land transportation, a simple refrigerated storage, a normal temperature storage, or any other suitable storage, for example.

INDUSTRIAL APPLICABILITY

As can be seen from the foregoing description, the present invention is useful as a gas supply device which supplies nitrogen-enriched air into a container, and a container refrigeration apparatus having such a gas supply device.

DESCRIPTION OF REFERENCE CHARACTERS

10 Container Refrigeration Apparatus
11 Container
15 Plant
20 Refrigerant Circuit
30 Gas Supply Device
31 Air Pump
31a First Pump Mechanism
31a Second Pump Mechanism
32 First Directional Control Valve (Switching Mechanism, First Solenoid Valve)
33 Second Directional Control Valve (Switching Mechanism, Second Solenoid Valve)
34 First Adsorption Column (First Adsorption Portion)
35 Second Adsorption Column (Second Adsorption Portion)
41 Motor
60 CA System (Inside Air Control System)
70 Unit Case
71 Temperature Sensor
72 Ammeter
91 Malfunction Diagnosis Section
92 Malfunction Notifier

The invention claimed is:

1. A gas supply device provided for a container in which a breathing plant is housed, the device comprising:
a first adsorption portion and a second adsorption portion in each of which an adsorbent for adsorbing nitrogen in air is provided;

an air pump having a first pump mechanism connected to one of the first adsorption portion and the second adsorption portion, and a second pump mechanism connected to the other one of the first adsorption portion and the second adsorption portion, the first pump mechanism supplying outside air to the first or second adsorption portion to allow the adsorbent to adsorb nitrogen in the outside air and thereby producing oxygen-enriched air having a higher oxygen concentration than the outside air, the second pump mechanism sucking air from the first or second adsorption portion and thereby producing nitrogen-enriched air containing the nitrogen desorbed from the adsorbent;
a motor which drives the air pump;
a switching mechanism which alternately switches between a first connection state in which the first adsorption portion is connected to the first pump mechanism and the second adsorption portion is connected to the second pump mechanism, and a second connection state in which the second adsorption portion is connected to the first pump mechanism and the first adsorption portion is connected to the second pump mechanism;
a supply passage which allows the second pump mechanism to communicate with an interior of the container and guides the nitrogen-enriched air to the interior of the container; and
an oxygen discharge passage which allows the first and second adsorption portions to communicate with an outside and guides the oxygen-enriched air to the outside, wherein
the gas supply device has a malfunction diagnosis section which checks whether each of components of the gas supply device works properly or not and specifies a malfunctioning portion if an oxygen concentration of the nitrogen-enriched air does not fall to or below a predetermined concentration, and
the malfunction diagnosis section checks whether each of the air pump, the motor, and the switching mechanism works properly or not, and determines that the adsorbent is not working properly when it is determined that all of the air pump, the motor, and the switching mechanism work properly.

2. The gas supply device of claim 1, comprising:
a unit case which houses at least the air pump and the motor, wherein
the malfunction diagnosis section
determines that the air pump and the motor work properly if a temperature in the unit case increases after start of operation of the air pump from a temperature in the unit case before the start of the operation of the air pump, and
determines that the air pump or the motor malfunctions if the temperature in the unit case does not increase after the start of the operation of the air pump from the temperature in the unit case before the start of the operation of the air pump.

3. The gas supply device of claim 1, wherein
the malfunction diagnosis section
determines that the air pump and the motor work properly if a pressure in the oxygen discharge passage increases after start of operation of the air pump from a pressure in the oxygen discharge passage before the start of the operation of the air pump, and
determines that the air pump or the motor malfunctions if the pressure in the oxygen discharge passage does not increase after the start of the operation of the air pump from the pressure in the oxygen discharge passage before the start of the operation of the air pump.

4. The gas supply device of claim 2, wherein
the malfunction diagnosis section
determines that the air pump malfunctions if it is determined that the air pump or the motor is malfunctioning and a value of a current of the motor is in a predetermined normal range, and
determines that the motor malfunctions if it is determined that the air pump or the motor is malfunctioning and the value of the current of the motor does not fall within the predetermined normal range.

5. The gas supply device of claim 1, wherein
the switching mechanism includes
a first solenoid valve which switches between a first state where the first adsorption portion is connected to the first pump mechanism, and a second state where the first adsorption portion is connected to the second pump mechanism, and
a second solenoid valve which switches between a first state where the second adsorption portion is connected to the second pump mechanism, and a second state where the second adsorption portion is connected to the first pump mechanism, wherein
the switching mechanism is capable of switching between a dual pressurization state in which the first solenoid valve is in the first state and the second solenoid valve is in the second state, and a dual depressurization state in which the first solenoid valve is in the second state and the second solenoid valve is in the first state,
the first and second solenoid valves are switched to one of the dual pressurization state and the dual depressurization state when both of the first and second solenoid valves are not energized, and switched to the other one of the dual pressurization state and the dual depressurization state when the both of the first and second solenoid valves are energized, and
the malfunction diagnosis section
determines that the switching mechanism works properly if a difference in pressure in the oxygen discharge passage before and after a switching operation, in which the first and second solenoid valves are simultaneously switched from a nonenergized state to an energized state, is more than or equal to a predetermined pressure, and
determines that the switching mechanism malfunctions if the difference in the pressure in the oxygen discharge passage before and after the switching operation is less than the predetermined pressure.

6. The gas supply device of claim 1, comprising
a malfunction notifier which, if the malfunction diagnosis section specifies a malfunctioning portion in the gas supply device, notifies a user of the malfunctioning portion.

7. A container refrigeration apparatus attached to a container in which a breathing plant is housed, the apparatus comprising:
a refrigerant circuit which performs a refrigeration cycle to cool inside air of the container; and
an inside air control system which includes a gas supply device which supplies gas into the container, and an exhaust portion through which the inside air of the container is exhausted outside, the inside air control system controlling a composition of the inside air in the container, wherein the gas supply device is comprised of the gas supply device of claim 1.

8. The gas supply device of claim 3, wherein
the malfunction diagnosis section
   determines that the air pump malfunctions if it is determined that the air pump or the motor is malfunctioning and a value of a current of the motor is in a predetermined normal range, and
   determines that the motor malfunctions if it is determined that the air pump or the motor is malfunctioning and the value of the current of the motor does not fall within the predetermined normal range.

9. The gas supply device of claim 2, wherein
the switching mechanism includes
a first solenoid valve which switches between a first state where the first adsorption portion is connected to the first pump mechanism, and a second state where the first adsorption portion is connected to the second pump mechanism, and
a second solenoid valve which switches between a first state where the second adsorption portion is connected to the second pump mechanism, and a second state where the second adsorption portion is connected to the first pump mechanism, wherein
the switching mechanism is capable of switching between a dual pressurization state in which the first solenoid valve is in the first state and the second solenoid valve is in the second state, and a dual depressurization state in which the first solenoid valve is in the second state and the second solenoid valve is in the first state,
the first and second solenoid valves are switched to one of the dual pressurization state and the dual depressurization state when both of the first and second solenoid valves are not energized, and switched to the other one of the dual pressurization state and the dual depressurization state when the both of the first and second solenoid valves are energized, and
the malfunction diagnosis section
   determines that the switching mechanism works properly if a difference in pressure in the oxygen discharge passage before and after a switching operation, in which the first and second solenoid valves are simultaneously switched from a nonenergized state to an energized state, is more than or equal to a predetermined pressure, and
   determines that the switching mechanism malfunctions if the difference in the pressure in the oxygen discharge passage before and after the switching operation is less than the predetermined pressure.

10. The gas supply device of claim 3, wherein
the switching mechanism includes
a first solenoid valve which switches between a first state where the first adsorption portion is connected to the first pump mechanism, and a second state where the first adsorption portion is connected to the second pump mechanism, and
a second solenoid valve which switches between a first state where the second adsorption portion is connected to the second pump mechanism, and a second state where the second adsorption portion is connected to the first pump mechanism, wherein
the switching mechanism is capable of switching between a dual pressurization state in which the first solenoid valve is in the first state and the second solenoid valve is in the second state, and a dual depressurization state in which the first solenoid valve is in the second state and the second solenoid valve is in the first state,
the first and second solenoid valves are switched to one of the dual pressurization state and the dual depressurization state when both of the first and second solenoid valves are not energized, and switched to the other one of the dual pressurization state and the dual depressurization state when the both of the first and second solenoid valves are energized, and
the malfunction diagnosis section
   determines that the switching mechanism works properly if a difference in pressure in the oxygen discharge passage before and after a switching operation, in which the first and second solenoid valves are simultaneously switched from a nonenergized state to an energized state, is more than or equal to a predetermined pressure, and
   determines that the switching mechanism malfunctions if the difference in the pressure in the oxygen discharge passage before and after the switching operation is less than the predetermined pressure.

11. The gas supply device of claim 4, wherein
the switching mechanism includes
a first solenoid valve which switches between a first state where the first adsorption portion is connected to the first pump mechanism, and a second state where the first adsorption portion is connected to the second pump mechanism, and
a second solenoid valve which switches between a first state where the second adsorption portion is connected to the second pump mechanism, and a second state where the second adsorption portion is connected to the first pump mechanism, wherein
the switching mechanism is capable of switching between a dual pressurization state in which the first solenoid valve is in the first state and the second solenoid valve is in the second state, and a dual depressurization state in which the first solenoid valve is in the second state and the second solenoid valve is in the first state,
the first and second solenoid valves are switched to one of the dual pressurization state and the dual depressurization state when both of the first and second solenoid valves are not energized, and switched to the other one of the dual pressurization state and the dual depressurization state when the both of the first and second solenoid valves are energized, and
the malfunction diagnosis section
   determines that the switching mechanism works properly if a difference in pressure in the oxygen discharge passage before and after a switching operation, in which the first and second solenoid valves are simultaneously switched from a nonenergized state to an energized state, is more than or equal to a predetermined pressure, and
   determines that the switching mechanism malfunctions if the difference in the pressure in the oxygen discharge passage before and after the switching operation is less than the predetermined pressure.

12. The gas supply device of claim 8, wherein
the switching mechanism includes
a first solenoid valve which switches between a first state where the first adsorption portion is connected to the first pump mechanism, and a second state where the first adsorption portion is connected to the second pump mechanism, and a second solenoid valve which switches between a first state where the second adsorption portion is connected to the second pump mechanism, and a second state where the second adsorption portion is connected to the first pump mechanism, wherein the switching mechanism is capable of switching between a dual pressurization state in which the first solenoid valve is in the first state and the second solenoid valve is in the second state, and a dual depressurization state in which the first solenoid valve is in the second state and the second solenoid valve is in the first state, the first and second solenoid valves are switched to one of the dual pressurization state and the dual depressurization state when both of the first and second solenoid valves are not energized, and switched to the other one of the dual pressurization state and the dual depressurization state when the both of the first and second solenoid valves are energized, and the malfunction diagnosis section
- determines that the switching mechanism works properly if a difference in pressure in the oxygen discharge passage before and after a switching operation, in which the first and second solenoid valves are simultaneously switched from a nonenergized state to an energized state, is more than or equal to a predetermined pressure, and
- determines that the switching mechanism malfunctions if the difference in the pressure in the oxygen discharge passage before and after the switching operation is less than the predetermined pressure.

13. The gas supply device of claim 2, comprising
a malfunction notifier which, if the malfunction diagnosis section specifies a malfunctioning portion in the gas supply device, notifies a user of the malfunctioning portion.

14. The gas supply device of claim 3, comprising
a malfunction notifier which, if the malfunction diagnosis section specifies a malfunctioning portion in the gas supply device, notifies a user of the malfunctioning portion.

15. The gas supply device of claim 4, comprising
a malfunction notifier which, if the malfunction diagnosis section specifies a malfunctioning portion in the gas supply device, notifies a user of the malfunctioning portion.

16. The gas supply device of claim 8, comprising
a malfunction notifier which, if the malfunction diagnosis section specifies a malfunctioning portion in the gas supply device, notifies a user of the malfunctioning portion.

17. The gas supply device of claim 5, comprising
a malfunction notifier which, if the malfunction diagnosis section specifies a malfunctioning portion in the gas supply device, notifies a user of the malfunctioning portion.

18. The gas supply device of claim 9, comprising
a malfunction notifier which, if the malfunction diagnosis section specifies a malfunctioning portion in the gas supply device, notifies a user of the malfunctioning portion.

19. The gas supply device of claim 10, comprising
a malfunction notifier which, if the malfunction diagnosis section specifies a malfunctioning portion in the gas supply device, notifies a user of the malfunctioning portion.

20. The gas supply device of claim 11, comprising
a malfunction notifier which, if the malfunction diagnosis section specifies a malfunctioning portion in the gas supply device, notifies a user of the malfunctioning portion.

* * * * *